US012787925B2

(12) United States Patent
Patil et al.

(10) Patent No.: US 12,787,925 B2
(45) Date of Patent: Nov. 10, 2026

(54) HEAD ENGAGEMENT ASSIST SYSTEMS AND METHODS

(71) Applicant: Deere & Company, Moline, IL (US)

(72) Inventors: Gaurav Patil, Jalgaon (IN); Piyush Joshi, Pune (IN); Mehul P. Bhavsar, Pune (IN)

(73) Assignee: DEERE & COMPANY, Moline, IL (US)

( * ) Notice: Subject to any disclaimer, the term of this patent is extended or adjusted under 35 U.S.C. 154(b) by 364 days.

(21) Appl. No.: 18/470,522

(22) Filed: Sep. 20, 2023

(65) Prior Publication Data

US 2025/0089610 A1 Mar. 20, 2025

(51) Int. Cl.

| | |
|---|---|
| ***A01D 41/12*** | (2006.01) |
| ***A01D 41/127*** | (2006.01) |
| ***A01D 41/16*** | (2006.01) |
| ***A01D 67/00*** | (2006.01) |

(52) U.S. Cl.
CPC ........... *A01D 41/127* (2013.01); *A01D 41/16* (2013.01); *A01D 67/005* (2013.01)

(58) Field of Classification Search
CPC ..... A01D 41/127; A01D 41/16; A01D 67/005
See application file for complete search history.

(56) References Cited

U.S. PATENT DOCUMENTS

| | | | | |
|---|---|---|---|---|
| 4,266,395 | A * | 5/1981 | Basham | A01D 75/287 56/16.2 |
| 4,776,153 | A * | 10/1988 | DePauw | A01D 75/287 56/DIG. 15 |
| 10,531,607 | B2 * | 1/2020 | Schroeder | A01D 41/141 |
| 11,212,953 | B2 | 1/2022 | Ohrstrom et al. | |
| 11,375,654 | B2 * | 7/2022 | Vandeven | A01D 75/287 |
| 11,770,991 | B2 | 10/2023 | Ohrstrom et al. | |
| 12,219,890 | B2 | 2/2025 | Ohrstrom et al. | |
| 2016/0270290 | A1 * | 9/2016 | Johnson | A01D 75/287 |
| 2016/0302357 | A1 | 10/2016 | Tippery et al. | |
| 2016/0368336 | A1 | 12/2016 | Kahn et al. | |
| 2018/0168102 | A1 | 6/2018 | Saraiva et al. | |
| 2018/0255707 | A1 * | 9/2018 | Solimar Walter | E02F 3/3604 |

(Continued)

FOREIGN PATENT DOCUMENTS

| | | | | |
|---|---|---|---|---|
| EP | 3128828 B2 | 11/2021 | | |
| GB | 1105386 A | 3/1968 | | |
| WO | WO-2021028733 A1 * | 2/2021 | | A01D 41/16 |

OTHER PUBLICATIONS

Patil et al., Head Engagement Assist Systems and Methods, U.S. Appl. No. 18/470,542, filed Sep. 20, 2023, 44 pages (specification and drawings).

(Continued)

*Primary Examiner* — Claude J Brown

(57) ABSTRACT

Systems and methods for automatically aligning an agricultural machine with an implement to be attached to the agricultural machine may include sensing an orientation of an agricultural implement, determining a tilt of the agricultural implement based on the orientation of the agricultural implement; comparing the tilt of the agricultural implement to a tilt of a feederhouse of the agricultural machine; determining a difference between the tilt of the feederhouse and the tilt of the agricultural implement; and moving the feederhouse to align the tilt of the feederhouse with the tilt of the agricultural implement.

18 Claims, 9 Drawing Sheets

(56) References Cited

U.S. PATENT DOCUMENTS

| | | | |
|---|---|---|---|
| 2021/0127544 | A1 | 5/2021 | Ohrstrom et al. |
| 2021/0291902 | A1 | 9/2021 | Wang et al. |
| 2023/0114328 | A1 | 4/2023 | Jim et al. |
| 2024/0302198 | A1 | 9/2024 | Missotten et al. |

OTHER PUBLICATIONS

U.S. Appl. No. 18/470,542, filed Sep. 20, 2023.

* cited by examiner

HEAD ENGAGEMENT ASSIST SYSTEMS AND METHODS

FIELD OF THE DISCLOSURE

The present disclosure relates generally to engagement between a work machine and an implement.

BACKGROUND OF THE DISCLOSURE

Some work machines, such as agricultural work machines (e.g., combine harvesters) are used in combination with an implement, such as an agricultural head, to perform work. The work may be harvesting a crop in a field. In this example, a combine harvester connected with an agricultural head is moved through a field where the head operates to harvester crop. The harvested crop is directed into the combine harvester where the crop is processed, for example, to separate grain from other crop material.

SUMMARY OF THE DISCLOSURE

A first aspect of the present disclosure is directed to an apparatus. The apparatus may include one or more processors and a non-transitory computer-readable storage medium coupled to the one or more processors and storing programming instructions for execution by the one or more processors. The programming instructions may instruct the one or more processors to sense an orientation of an agricultural head; determine a tilt of the agricultural head based on the orientation of the agricultural head; compare a tilt of the agricultural head to a tilt of a feederhouse of an agricultural harvester; determine a difference between the tilt of the feederhouse and the tilt of the head; and move the feederhouse to align the tilt of the feederhouse with the tilt of the agricultural head.

A second aspect of the present disclosure is directed to a computer-implemented method performed by one or more processors for automatically aligning a feederhouse of an agricultural harvester with an agricultural head. The method may include sensing an orientation of an agricultural head; determining a tilt of the agricultural head based on the orientation of the agricultural head; comparing a tilt of the agricultural head to a tilt of a feederhouse of an agricultural harvester; determining a difference between the tilt of the feederhouse and the tilt of the head; and moving the feederhouse to align the tilt of the feederhouse with the tilt of the agricultural head.

The various aspects of the present disclosure may include one or more of the following features. Programming instructions to instruct the one or more processors to sense an orientation of the agricultural head may include programming instructions to receive an image of an agricultural head. Programming instructions to instruct the one or more processors to receive the image of the agricultural head may include programming instructions to instruct the one or more processors to receive the image from a camera located on the agricultural harvester. Programming instructions to instruct the one or more processors to sense the orientation of an agricultural head may include programming instructions to instruct the one or more processors to determine the orientation of the agricultural head based on the image. Programming instructions may include programming instructions to instruct the one or more processors to sense an orientation of the feederhouse and determine the tilt of the feederhouse based on the orientation of the feederhouse. Programming instructions to instruct the one or more processors to sense the orientation of the feederhouse may include programming instructions to instruct the one or more processors to sense the orientation of the feederhouse with one of a pitch sensor and roll sensor. Programming instructions to instruct the one or more processors to move the feederhouse to align the tilt of the feederhouse with the tilt of the agricultural head may include programming instructions to cause the one or more processors to actuate an actuator configured to pivot the feederhouse. Programming instructions to instruct the one or more processors to move the feederhouse to align the tilt of the feederhouse with the tilt of the agricultural head may include programming instructions to alter one of a lateral tilt of the feederhouse and a longitudinal tilt of the feederhouse. Programming instructions to instruct the one or more processors to sense an orientation of an agricultural head may include programming instructions to instruct the one or more processors to sense a feature of the agricultural head.

An orientation of the feederhouse may be sensed, and the tilt of the feederhouse may be determined based on the orientation of the feederhouse. Sensing the orientation of the feederhouse may include sensing the orientation of the feederhouse with one of a pitch sensor and a roll sensor. Moving the feederhouse to align the tilt of the feederhouse with the tilt of the agricultural head may include actuating an actuator configured to pivot the feederhouse. Moving the feederhouse to align the tilt of the feederhouse with the tilt of the agricultural head may include altering one of a lateral tilt of the feederhouse and a longitudinal tilt of the feederhouse. Sensing an orientation of an agricultural head may include sensing a feature of the agricultural head.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
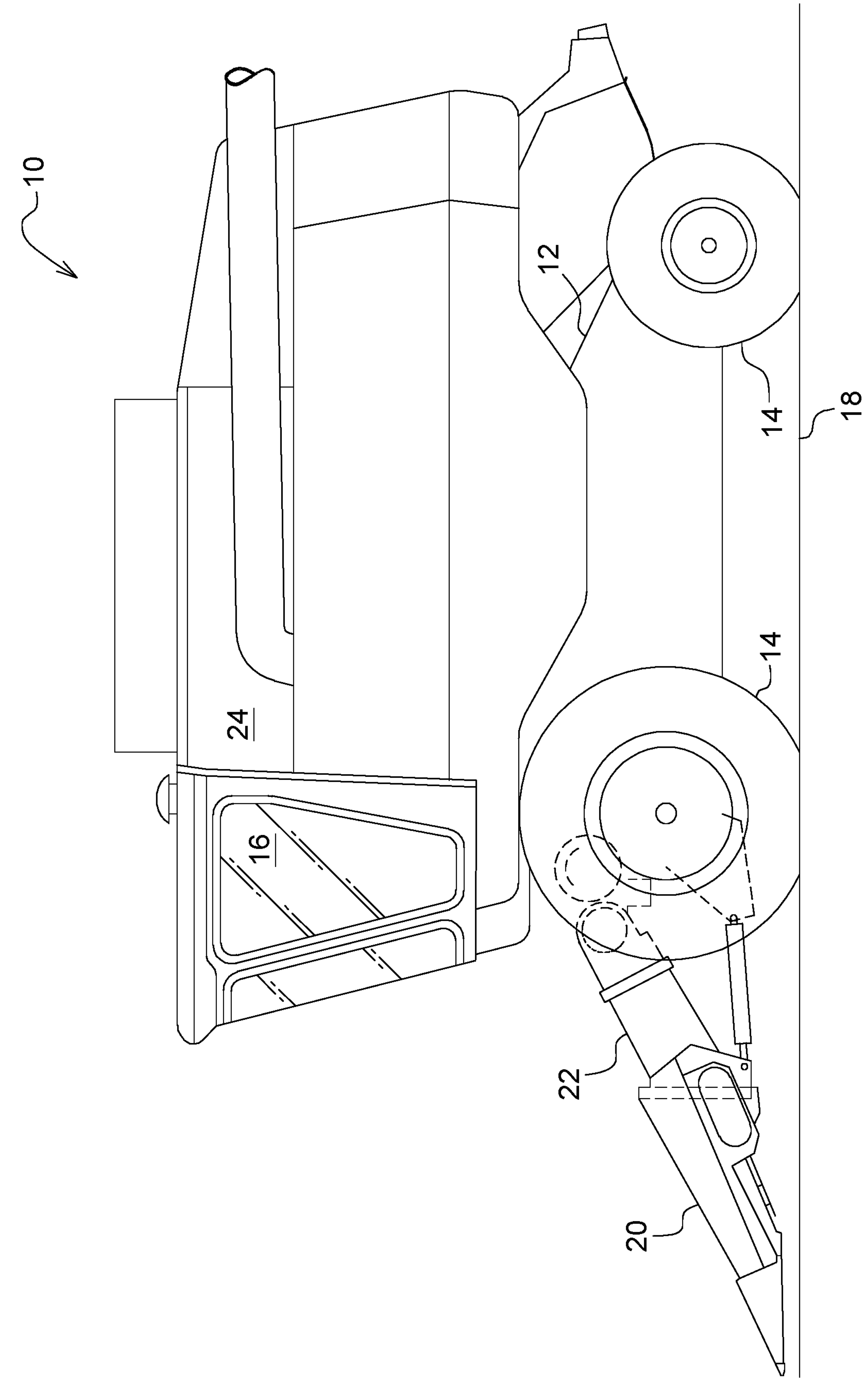
FIG. 1 is a diagrammatic view of an example combine harvester, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and methods for connecting an implement to a work machine. For example, the present disclosure is directed to connecting an agricultural implement to an agricultural work machine. The present disclosure encompasses automatically controlling a feature of the agricultural work machine as the work machine is connected to the agricultural head. For example, in the example of a combine harvester, the combine harvester includes a feederhouse that extends from a front end of the combine harvester. The agricultural implement engages the feederhouse to connect the agricultural head to the combine harvester.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle.

For example, the term "forward" (and the like) corresponds to a forward direction of travel of a head or combine harvester, such as during a harvesting operation. Likewise, the term "rearward" (and the like) corresponds to a direction opposite the forward direction of travel. In this regard, for example, a "forward facing" feature on a head may generally face in the direction that the head travels during normal operation, while a "rearward facing" feature may generally face opposite that direction.

Also as used herein, with respect to a head (or components thereof), unless otherwise defined or limited, the term "leading" (and the like) indicates a direction of travel of the head during normal operation (e.g., the forward direction of travel of a harvester vehicle carrying a head). Similarly, the term "trailing" (and the like) indicates a direction that is opposite the leading direction. In this regard, for example, a "leading" edge of a head may be generally disposed at the front of the head, with respect to the direction travel of the head during normal operation (e.g., as carried by a combine harvester). Likewise, a "trailing" edge of a head may be generally disposed at the back of the head opposite the leading edge, with respect to the direction of travel of the head during normal operation.

Although the present disclosure is made in the context of agriculture, the scope of the disclosure is not so limited. Rather, the scope of the disclosure encompasses other industries, particularly those industries where connecting an implement to a work machine is needed or otherwise desired.

FIG. 1 is a diagrammatic view of an example combine harvester 10 that includes a base 12 with wheels 14 rotatably coupled thereto and a cab 16 mounted to the base 12. In some implementations, other types of ground engaging components, such as tracks, may be used in place of or in combination with wheels 14. The wheels 14 allow the combine harvester 10 to move across the ground 18. A head 20 that operates to harvest crop and transport the harvested crop to the combine harvester 10 is connected to a feederhouse 22 of the combine harvester 10. The feederhouse 22 includes a conveyor that transports the harvested crop into the combine harvester 10 for further processing. For example, the harvested crop may be threshed, and grain from the crop may be separated from material other than grain (MOG) within the combine harvester 10. The separate grain is stored in a grain bin 24 and the MOG is expelled from the combine harvester 10. Although a combine harvester is described, other types of harvesters are also within the scope of the present disclosure, such as a self-propelled forage harvester.

Figure 2:
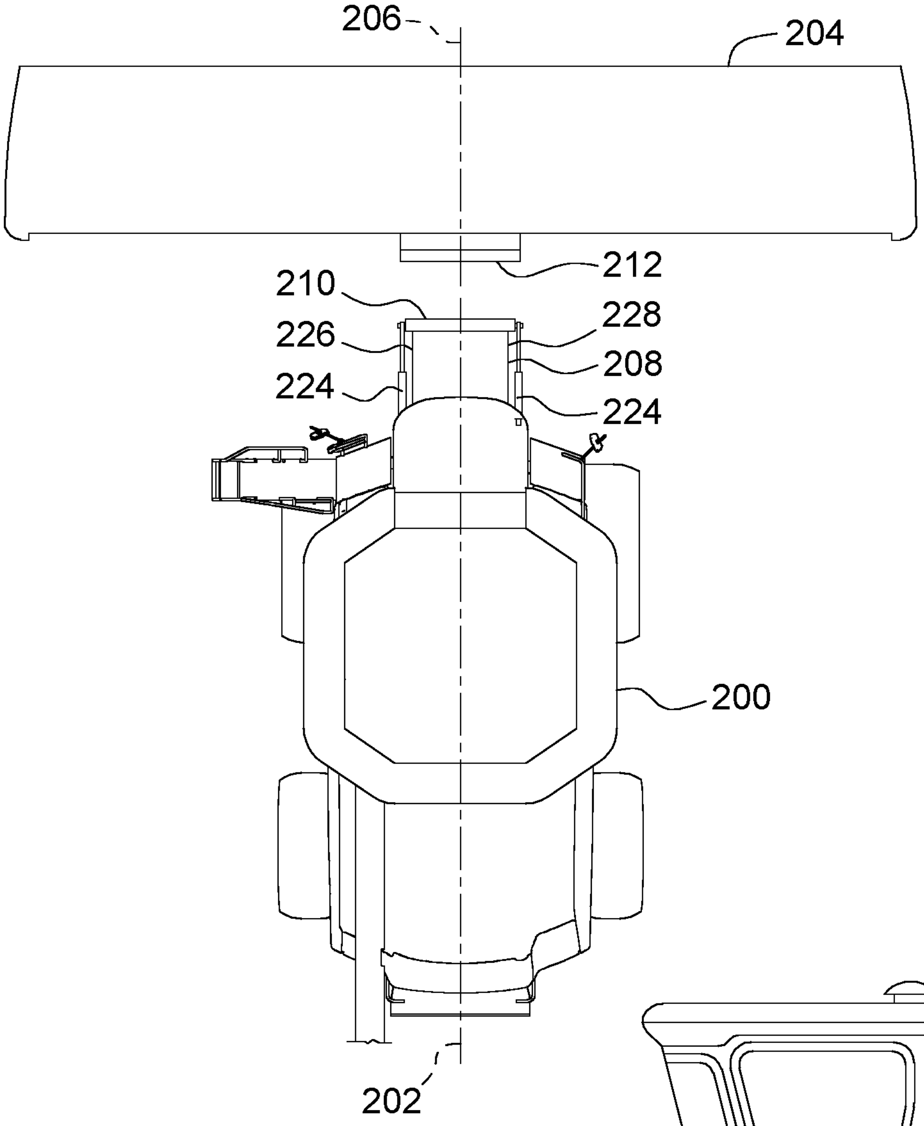
FIG. 2 is a diagrammatic plan view of an example harvester and head to be connected to the harvester, according to some implementations of the present disclosure.

Coupling an agricultural head to a harvester can be challenging. Generally, a head is located on the ground or on a platform, such as a movable platform (e.g., a trailer) that allows the head to be moved from one location to another over conventional roads. To connect the harvester to the head, longitudinal alignment between the harvester and the head is needed. For example, as shown in FIG. 2, a harvester 200, similar to the harvester 10, includes a longitudinal axis 202, and a head 204, similar to head 20, that includes a longitudinal axis 206. The longitudinal axes 202 and 206 are made to align in order to connect the head 204 to the harvester 200.

Figure 3:
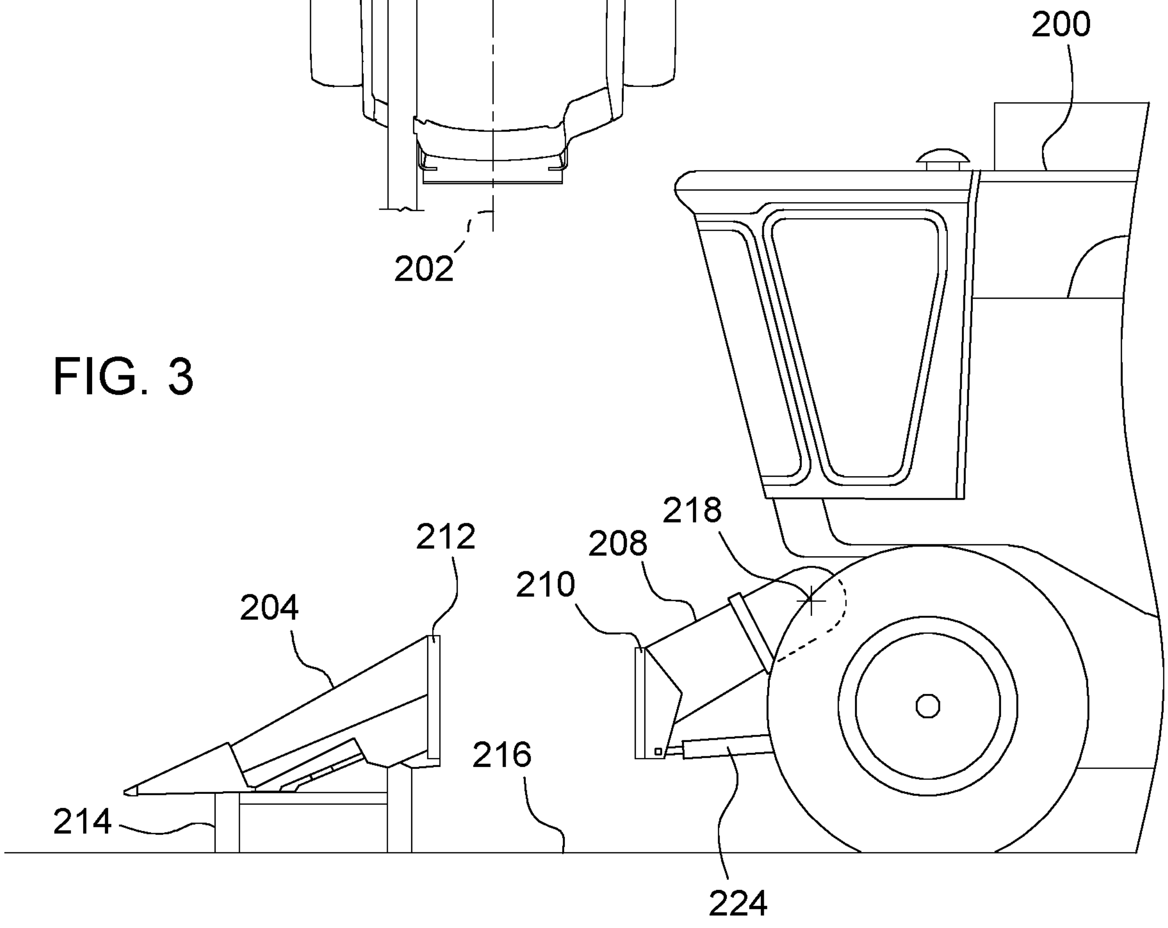
FIG. 3 is a detail view of a portion of an example harvester, according to some implementations of the present disclosure.

Additionally, connecting a head to a harvester is further complicated by aligning the head and a feederhouse of the harvester vertically. As shown in FIG. 3, a feederhouse 208 of the harvester 200 is positioned vertically so that a mounting structure 210 (e.g., a frame, bracket, etc.) of the feederhouse 208 aligns with a counterpart mounting structure 212 (e.g., a frame, bracket, etc.) located on the head 204. As shown in FIG. 3, the head 204 is located on a platform 214, elevating the head 204 from the ground 216. Therefore, the feederhouse 208 is positioned vertically, such as by rotating the feederhouse 208 about a pivot axis 218, to align the mounting structure 210 with the mounting structure 212 to permit coupling of the head 204 to the harvester 200.

Figure 4:
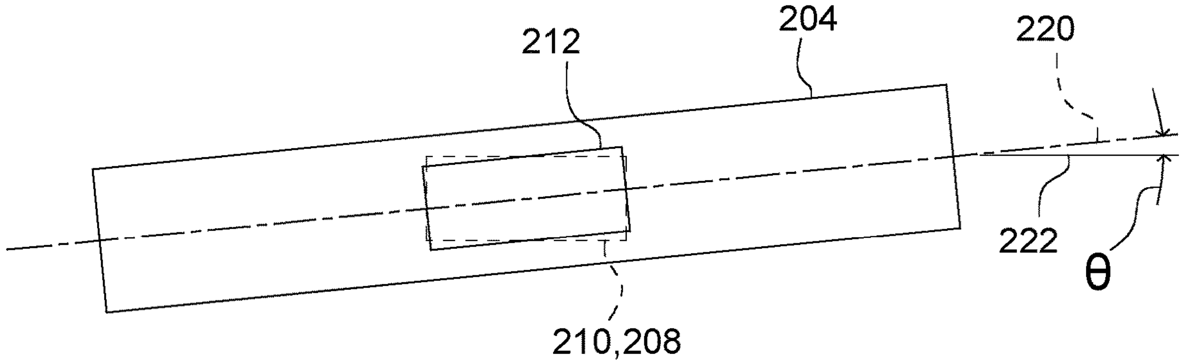
FIG. 4 is a diagrammatic view illustrating a misalignment of a mounting surface of a feederhouse and a mounting structure of a head, according to some implementations of the present disclosure.

Still further, connecting the head 200 to the harvester may also involve aligning a tilt of a feederhouse of a harvester with a tilt of a head. FIG. 4 is a diagrammatic view illustrating a misalignment of the mounting surface 210 of the feederhouse 218 and the mounting structure 212 of the head 204. As shown, the head 204 has a lateral tilt defining an angle θ between a lateral axis 220 of the head 204 and a horizontal plane 222. In some instances, to align the mounting structures 210 and 212 laterally, a lateral tilt of the feederhouse 208 is pivoted laterally with the use of one or more actuators, such as actuators 224 shown in FIGS. 2 and 3. As shown in the example of FIG. 3, one of the actuators 224 is located on a first side 226 of the feederhouse 208, and another one of the actuators 224 is located on a second side 228 of the feederhouse 208, opposite the first side 226.

To alter a tilt of the feederhouse 208 and, hence, the mounting structure 210, the actuators 224 can be actuated to alter a lateral orientation of the feederhouse 208. In this way, the lateral orientation of the feederhouse 208 can be made to align with the lateral orientation of the head 204 and, hence, the mounting structure 212 of the head 204.

Connecting a head with a harvester is further complicated by the limited view provided to an operator in a cab of the harvester. The position within the cab provides the operator with limited visibility and, consequently, information as to a position and orientation of the head relative to the harvester. Additionally, the operator's position can cause difficulty in judging a position and orientation of the feederhouse in order to control a position of the feederhouse, e.g., height, tilt, and lateral position, and make satisfactory engagement with the head.

To overcome these difficulties, the present disclosure provides for automated control of the feederhouse of a harvester to align the feederhouse with a head, thereby reducing time and effort required to manually connect the harvester and the head.

Figure 5:
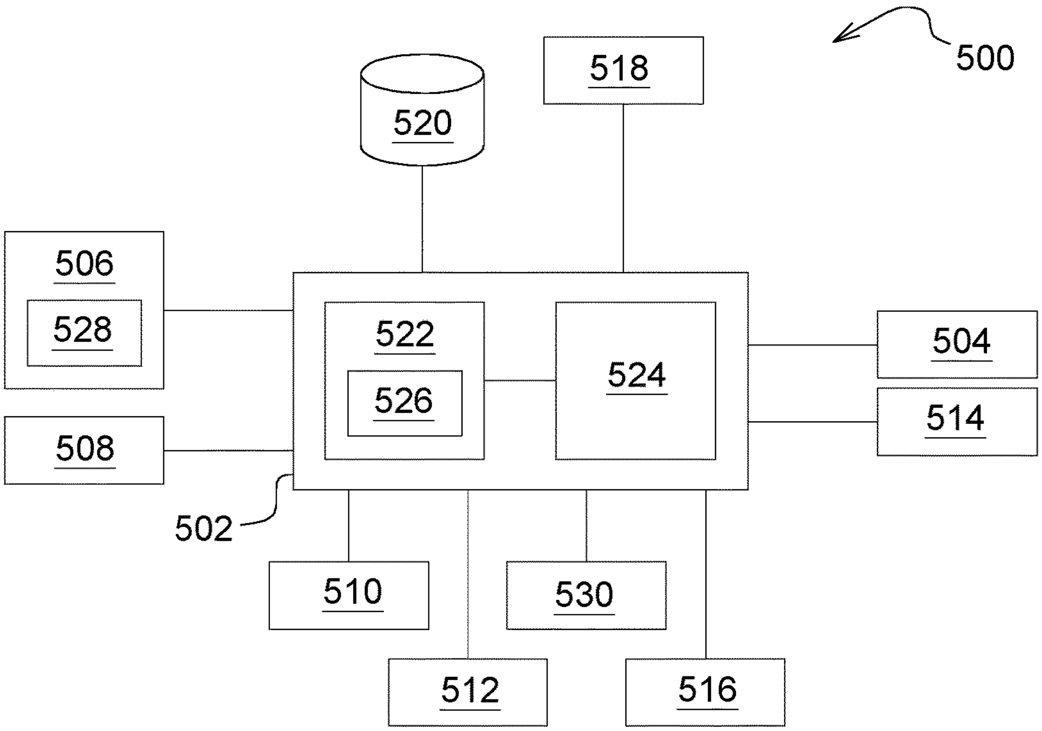
FIG. 5 is a schematic view of an example electronic control system for automatically controlling connection of a feederhouse of a harvester with a head, according to some implementations of the present disclosure.

FIG. 5 is a schematic view of an example electronic control system 500 for automatically controlling connection of a feederhouse (such as example feederhouse 208) of a harvester (such as example harvester 200) with a head (such as example head 204). The control system 500 includes an electronic controller 502, a sensor 504, a display 506, an input device 508, and a first actuator 510, a second actuator 512, a third actuator 514, and a propulsion system 516. In some implementations, the sensor 504 is one or more image sensors. For example, in some instances, the image sensor 504 includes an optical camera, such as a mono camera or a stereo camera. In other implementations, the sensor 504 includes one or more laser transceivers. The first and second actuators 510 and 512 may be similar to the actuators 224, described earlier. The first and second actuators 510 and 512 are operable to adjust a pitch (and, consequently, vertical height of the feederhouse) and a lateral tilt of the feederhouse in response to output from the controller 502. In some instances, the actuators 510 and 512 are connected at opposing lateral sides of the feederhouse, for example, as shown in FIG. 2.

The third actuator 514 is operable to adjust a direction of movement of the harvester. For example, the third actuator 514 forms part of a steering system and is operable to adjust a steering angle of the harvester (e.g., by altering an angle of the wheels of the harvest) to control a direction of travel of the harvester. The third actuator 514 is operable in response to output from the controller 502. The propulsion system 516 is operable to control a rate of travel of the harvester. For example, the propulsion system 516 is operable in response to output from the controller 502 to control a rate of speed of the harvester. Together, the controller 502 operates the third actuator 514 and the propulsion system 516 to control a direction and speed of movement of the harvester and, hence, a path traveled by the harvester.

The control system 500 also includes a proximity sensor 518. The proximity sensor 518 is included on the harvester and is operable to sense a distance of an object from the harvester. For example, the proximity sensor 518 is operable to sense a distance of the head from the harvester, and this distance information is provided to the controller 502. Example proximity sensors 518 include laser sensors and ultrasonic sensors. The control system 500 may also include a tilt sensor 530 that is operable to detect a lateral tilt of the harvester. In some implementations, the tilt sensor 530 is a tilt sensor, a roll and pitch sensor, an inertial measurement sensor, or another type of sensor operable to sense a tilt of an object. As indicated, the sensor 530 is operable at least to sense a lateral tilt of the harvester.

The control system 500 may also include or be communicably coupled to a remote database 520, which may be in the form of cloud storage, a remote server, or some other type of electronic storage configured to store information. The various components of the control system 500 are communicably coupled to the controller 502, such as via a wired or wireless connection.

In some implementations, the controller 502 is an electronic computer, such as computer 1002 described in more detail below. The controller 502 includes a processor 522 communicably coupled to a memory 524. Additional details of the controller 502, such as processor 522 and memory 524, are described below in the context of computer 1002. In some implementations, the controller 502 is communicably coupled with a network, such as in a manner described in more detail below in the context of FIG. 10. The memory 524 communicates with the processor 522 and is used to store programs and other software, information, and data. The processor 522 is operable to execute programs and software and receive information from and send information to the memory 524. Although a single memory 524 and a single processor 522 are illustrated, in other implementations, a plurality of memories, processors, or both may be used. Although the processor 522 and the memory 524 are shown as being local components of the controller 502, in other implementations, one or both of the processor 522 and memory 524 may be located remotely. Software 526, such as in the form of an application or program, is executed by the processor 522 to control operation of the control system 500, as described herein. Particularly, the software 526 includes executable instructions operable to control operation of the various components coupled to the controller 502 and, as a result, control an orientation of the head and movement of the harvester to automatically connect the feederhouse to the head.

The input device 508 is communicably coupled via a wired or wireless connection. Example input devices 508 include a keyboard, keypad, one or more buttons, a slider bar, a dial, a knob, a mouse, or a joystick. The display 506 is communicably coupled to the controller 502 via a wired or wireless connection. The display 506 displays information, such as information related to the operation of control system 500. For example, information displayed by the display 506 may include a position of the head (e.g., pitch and lateral tilt), a speed and direction of movement of the harvester, and a distance between the harvester (and, in some instances, the feederhouse) and the head. In some instances, the information displayed by the display 506 is displayed via a graphical user interface (GUI) 528. Example displays include cathode ray tubes (CRT), liquid crystal displays (LCDs), or plasma displays. Other types of displays are also within the scope of the present disclosure. In some implementations, the display 506 is a touch screen that is operable to receive input from a user via a user's touch. In some implementations in which the display 506 is a touch screen, the input device 508 may be omitted.

Figure 6:
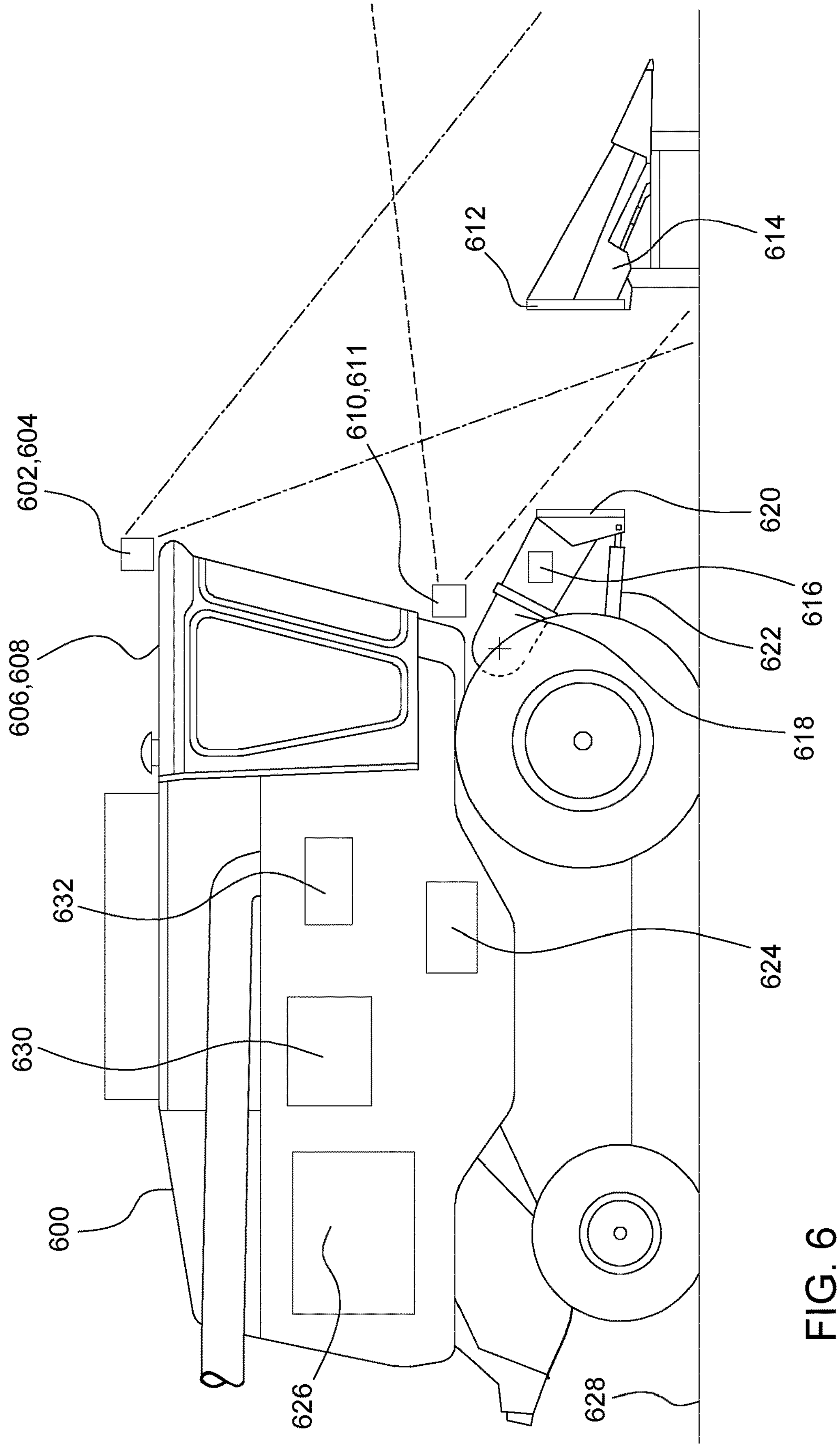
FIG. 6 is a diagrammatic view of an example harvester that includes a control system for automatically controlling connection of the harvester with a head, according to some implementations of the present disclosure.

FIG. 6 is a diagrammatic view showing an example harvester 600 that includes a control system similar to the control system 500, described above. As such, the harvester 600 includes an image sensor 602 located at an elevated location 604 on the harvester 600. For example, the image sensor 602 is located on a roof 606 of a cab 608 of the harvester 600. In other implementations, the harvester 600 includes, in addition to or in place of the image sensor 602, an image sensor 610 at a position 611 with a reduced elevation (compared to the elevated position 604) on the harvester 600. For example, the image sensor 610 may be positioned to provide an image of a mounting structure 612 provided on a head 614. The image sensors 602 and 610 are positioned to view an area forward of the harvester 600, for example to view the head 614 to be coupled to the harvester 600. The harvester 600 also includes a proximity sensor 616 that is configured to detect a distance between the harvester 600. For example, in some implementations, the proximity sensor 616 is operable to detect a distance between a feederhouse 618 of the harvester and, in some instances, a mounting structure 620 of the feederhouse 618.

The harvester 600 also includes actuators 622, which may be similar to actuators 224, 510, and 512, that are operable to adjust a position of the feederhouse 618. For example, the actuators 224 are operable to alter a pitch (elevation) of the feederhouse 618 and to alter a lateral tilt of the feederhouse 618. The harvester also includes an actuator 624, which may be similar to actuator 514, is used to change a direction of travel of the harvester 600. For example, the actuator 624 may form part of a steering system and is used to alter a steering angle of a wheel or track of the harvester 600 to alter a travel direction thereof. Further, the harvester 600 includes a propulsion device 626 (e.g., an engine, a motor, or other motive apparatus) that is operable to propel the harvester 600 over the ground 628. The harvester 600 also includes an electronic controller 630 that is operable to receive input from sensors (e.g., image sensors 602 and 610 as well as proximity sensor 616), determines an orientation of the head 614, and operates the actuators 622, 624 and propulsion device 626 to connect the head 614 to the feederhouse 618. The harvester 600 also includes a tilt sensor 632 that is operable to sense a lateral tilt of the harvester 600.

Figure 7:
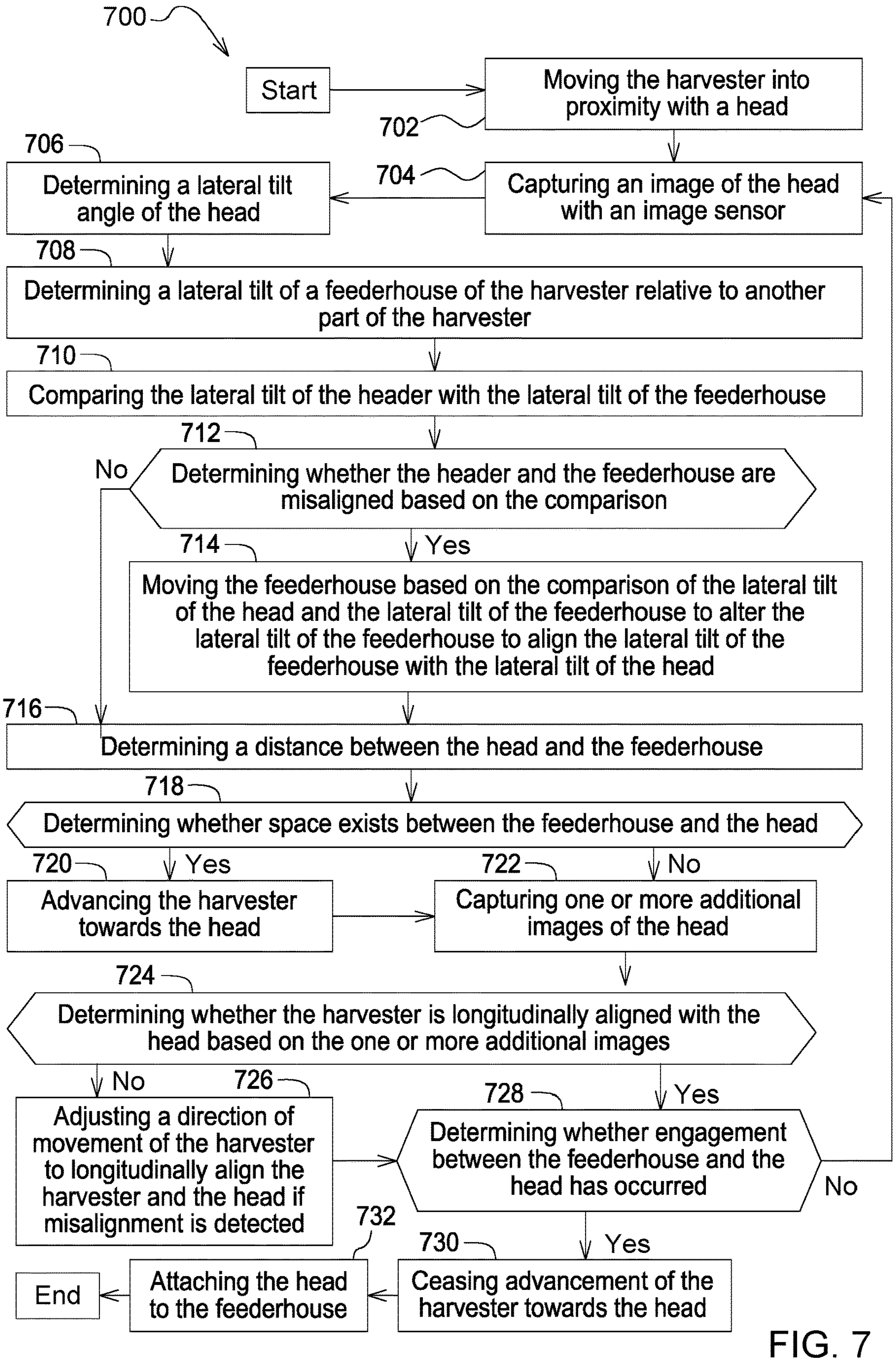
FIG. 7 is a flowchart of an example method for automatically coupling a head to a feederhouse, according to some implementations of the present disclosure.

FIG. 7 is a flowchart of an example method 700 for automatically coupling a head to a feederhouse. At 702, a harvester is brought into proximity of a head that is to be coupled to the harvester. In some implementations, an operator of the harvester directs the harvester to a location adjacent to the head. In other implementations, the harvester is autonomously brought into a position adjacent to the head. At 704, an image of the head is captured with an image sensor, such as image sensor 602 or 610. In some implementations, the captured image shows an orientation of the head relative to the harvester, including, for example, a lateral tilt angle of the head relative to the harvester. In some implementations, an image is captured by a number of image sensors, or a plurality of images is captured from one or more image sensors provided on the harvester. An example captured image is shown in FIG. 8.

Figure 8:
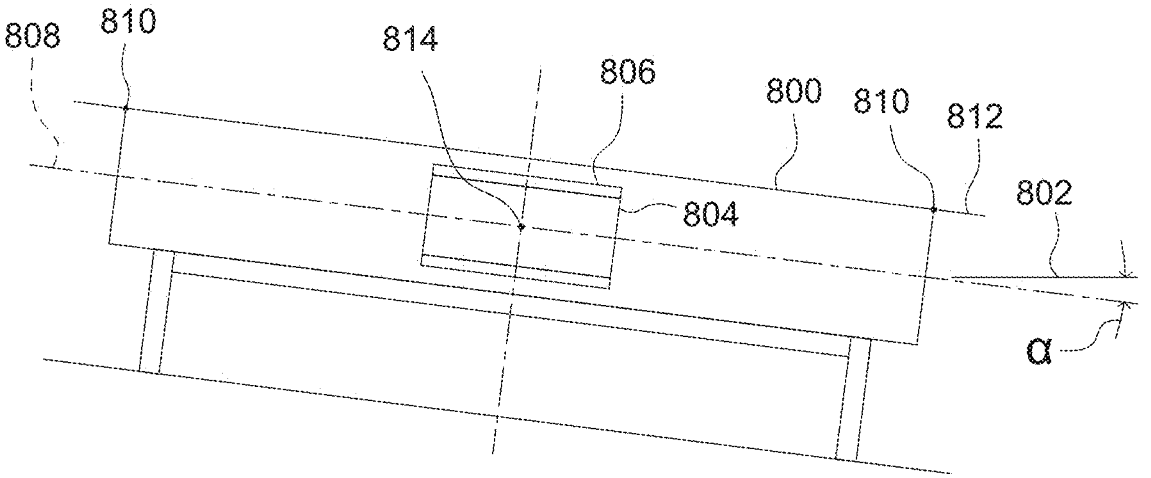
FIG. 8 is an example image of a head illustrating a tilt of the head, according to some implementations of the present disclosure.

Referring to FIG. 8, the captured image shows a head 800 with a tilt relative to a horizontal line 802 within the context of FIG. 8. The angle of tilt, represented by angle α, represents a lateral angular misalignment between the head and the harvester. The angle α can be determine from the image, such as using graphical or object detection techniques. For example, a controller, such as controller 502 or 630, analyzes the image to detect one or more objects or points in the image. The controller may, for example, detect part of a mounting structure 804 that is used to connect the head 800 to corresponding structure formed on a feederhouse of the harvester. In the illustrated example, the controller identifies upper portion 806 of the mounting structure 804, and this upper portion 806 is generally linear and generally aligned with a lateral axis 808 of the head 800. Using a horizontal reference, e.g., the horizontal line 802, a tilt angle of the head 800 is determined, i.e., angle α.

In other implementations, the controller determines the tilt angle of the head 800 based on detected points on the head. For example, the controller may detect two or more points on the head, such as corners 810. The controller then generates a line 812 using points 810. The generated line 812 is then used to determine the tilt angle using a horizontal reference, such as horizontal line 802.

The angle α represents an accurate angular tilt of the head 800 relative to the combine as a result of the image sensor used to capture the image being arranged on the combine in alignment with a lateral axis is that would be horizontal when the harvester was located on a level ground surface. However, in other implementations where the image sensor may not be aligned with a lateral axis of the harvester, the angle α is determinable using a correction angle that accounts for the angular offset of the image sensor relative to a lateral axis of the harvester.

The described approaches to determining a lateral tilt of the head in the context of the captured image are provided merely as examples. Other types of image analysis may be used to detect the lateral tilt of the head 800.

Figure 9:
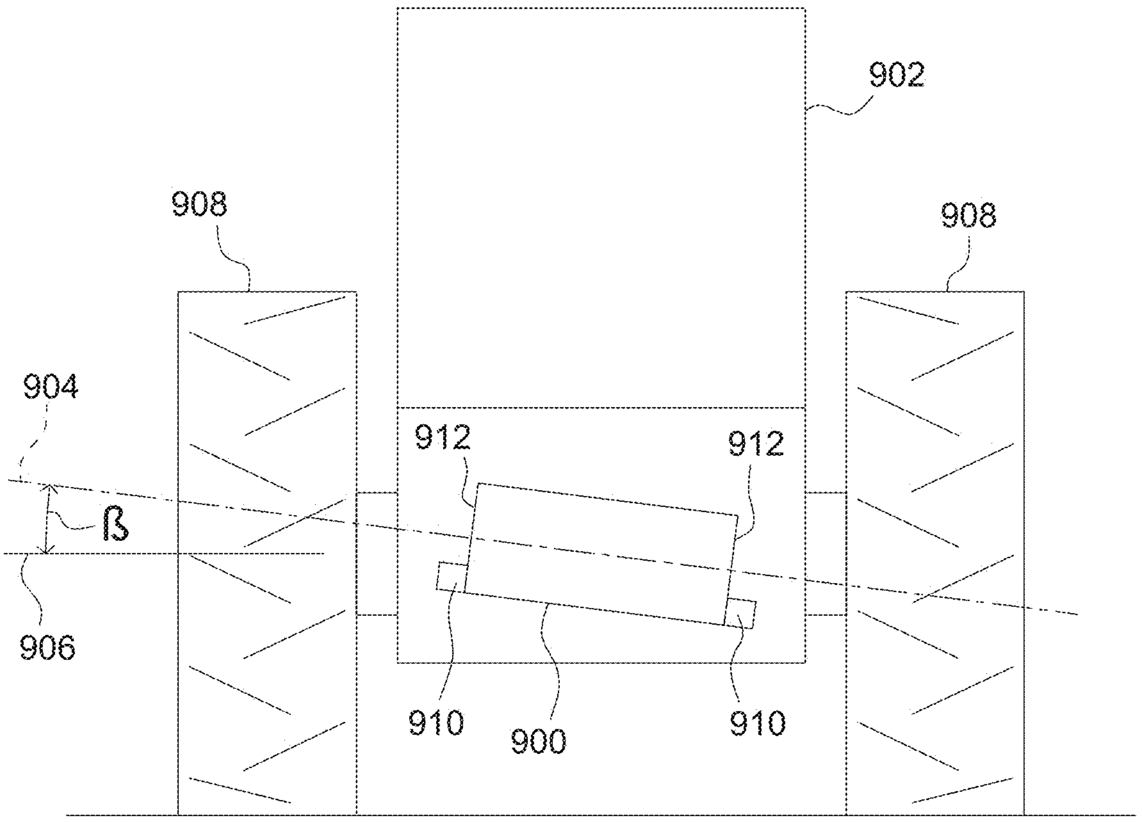
FIG. 9 is a front view of an example harvester with a feederhouse having a lateral tilt, according to some implementations of the present disclosure.

At 706, a lateral tilt angle of the head is determined. The tilt angle of the head may be determined as described herein, for example. At 708, an angular tilt of the feederhouse of the head relative to the harvester is determined. For example, the angular tilt of the feederhouse may be determined relative to another part of the harvester, such as the base (which may be similar to base 12) or cab of the harvester. Particularly, as shown in FIG. 9, an angular tilt of an example feederhouse 900 of a harvester 902 is determined based on an angle β defined by a lateral axis 904 of the feederhouse 900 and a lateral axis defined by another part of the harvester, such as a line defined by a rotational axis 906 of wheel 908 of the harvester 902. However, another lateral axis of the harvester 902 may be used. In some instances, the angle β is determined based on an amount of actuation of actuators 910, coupled, for example, at opposed lateral sides 912 of the feederhouse 900. Based on the individual amount of actuation of each actuator 910, a controller, such as controller 502 or 630, can determine an amount of lateral tilt of the feederhouse 900 and, hence, the angle β.

In some implementations, a lateral tilt of the feederhouse relative to the harvester (e.g., a lateral axis defined by the harvester, such as a rotational axis of a wheel of the harvester) may be determined using a tilt sensor. For example, a pitch or roll sensor may be used to determine a lateral tilt of the feederhouse. In some instances where the harvester is on a sloped surface, a lateral tilt of the feederhouse relative to the harvester may be determined using a first tilt sensor provided on the feederhouse and a second tilt sensor provided on the harvester, such as a base of the harvester. The outputs from the first and second tilt sensors can be used to determine a lateral tilt of the feederhouse relative to the harvester.

In some implementations, a pitch of the feederhouse may be altered to align the feederhouse with the head. In some instances, one or more pitch sensors on the harvester may be used. For example, a pitch of the feederhouse may be determined using a first pitch sensor on the harvester that senses a pitch of the harvester overall and a second pitch sensor on the feederhouse that determines a pitch of the feederhouse. The outputs from the first and second pitch sensors may be used to control a pitch of the feederhouse. In some implementations, a first roll sensor that senses a pitch of the harvester overall and an amount of extension of the actuators used to position the feederhouse is used to determine the pitch of the feederhouse relative to the harvester. These pieces of information can be used to control a pitch of the feederhouse to align the pitch of the feederhouse with a pitch of the head.

At 710, the lateral tilt of the head is compared with the lateral tilt of the feederhouse. Particularly, the angles $\alpha$ and $\beta$ are compared, and a correction angular value is determined, such as by the controller. For example, in some implementations, the comparison of angles $\alpha$ and $\beta$ involves determining a difference between the angles $\alpha$ and $\beta$. At 712, a determination is made as to whether the head and the feederhouse are misaligned. At 714, if the feederhouse and the head are misaligned, then the feederhouse is moved, based on the comparison of angles $\alpha$ and $\beta$, to align the feederhouse with the head. For example, the lateral tilt of the feederhouse is altered. In some implementations, the feederhouse is moved with actuators, such as actuators 224, 510, 512, and 622, to alter an angular orientation of the feederhouse to correspond to the angular position of the head.

At 716, a distance between the feederhouse (e.g., between a mounting structure of the feederhouse) and the head is determining. For example, a proximity sensor may be used to sense a distance between the harvester and the head, and the sensor outputs a signal representing the separation distance to a controller that uses the sensor output to determine the distance separating the feederhouse from the head. At 718, a determination is made as to whether there is space between the feederhouse and the head. At 720, if space exists between the feederhouse and the head, the harvester is advanced towards the head. In some implementations, the controller uses the separation distance to control operation of the propulsion device to move the harvester towards the head. At 722, one or more additional images of the head are captured. At 724, the one or more additional images are used to determine longitudinal alignment between the harvester and the head. For example, referring to FIG. 8, the controller analyzes the one or more additional images to identify a central location 814 on the head and determine if the central location 814 is offset laterally in the one or more additional images. In some implementations, the image captured at 704 may be used to determine longitudinal alignment, and, in such instances, 724 may be omitted. At 726, if a longitudinal misalignment is detected, direction of movement of the harvester is adjusted to longitudinally align the harvester with the head. For example, the controller outputs a signal to an actuator of a steering system of the harvester to alter a steering angle of wheels of the harvester to alter the direction of travel.

At 728, a determination is made as to whether engagement between the feederhouse and the head has occurred. Engagement may be detected based on an accelerometer that detects an impact or vibration that would occur upon contact between the feederhouse and the head. At 730, if engagement is detected, advancement of the harvester is ceased, and, at 732, the head is connected to the feederhouse, such as by actuation of a lock that secures the head to the feederhouse. If engagement is not detected, the method 700 returns to 704 to maintain angular alignment with, longitudinal alignment with, and advancement of the harvester towards the head.

The method 700 is provided merely as an example. The method 700 may be modified and still be within the scope of the present disclosure. For example, in some implementations, the image captured at 704 is used to determine a longitudinal alignment between the head and the harvester, and this comparison may be used to alter a direction of travel of the harvester, such as by altering a steering angle of the harvester. For example, the order of the described features may be altered, one or more features may be omitted, one or more features may be added, or a combination of these with the method 700 still remaining within the scope of the present disclosure. For example, the method 700 may include determining a currently selected steering angle and an amount of change to the steering angle, based on the currently selected steering angle, needed to move the harvester in a direction to achieve connection of the head to the harvester. Further, the method 700 may include detecting a currently selected orientation of the feederhouse and determining an amount of movement of the feederhouse, based on the currently selected orientation, to match an orientation of the head to achieve connection of the head to the harvester.

In some implementations, one or more aspects of the method 700, described above, may be displayed to an operator, such as on a display in a cab of a harvester. For example, in some instances, the information may be displayed on a display similar to display 506. In some instances, a determination of a lateral tilt of the head, a lateral tilt of the feederhouse, or both may be displayed on the display. Further, a controller, such as controller 702, may also display instructions to the operator as to how to move the feederhouse so that the lateral tilt of the feederhouse aligns with the lateral tilt of the head. In some instances, misalignment of the harvester relative to the head and guidance to align the harvester and the head may be indicated on a display with guidance lines. The guidance lines indicate to an operator how to maneuver, e.g., turn the harvester, in order to align the feederhouse of the harvester with the head, thereby providing a successful coupling between the head and the feederhouse. Thus, the scope of the present disclosure provides for both aligning and coupling a harvester and a head in an automated fashion as well as providing information to an operator to achieve all or a portion of the operations of aligning the feederhouse with the head and coupling the feederhouse with the head manually.

Figure 10:
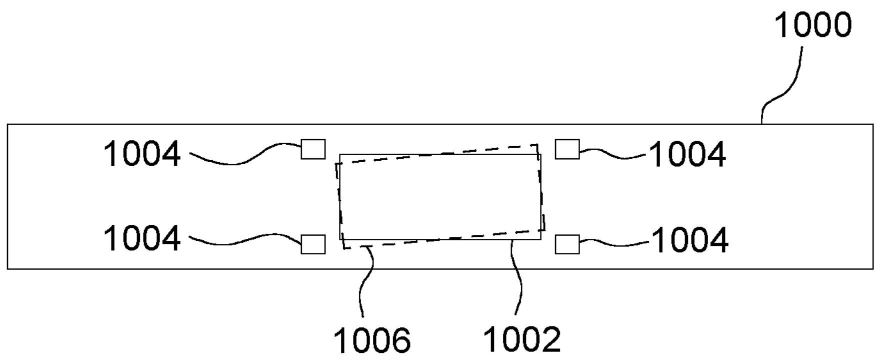
FIG. 10 is a diagrammatic view illustrating an example head with a mounting structure that is configured to engaged with a feederhouse of a harvester, according to some implementations of the present disclosure.

In some instances, alignment of a head and a feederhouse is accomplished using two or more lasers. FIG. 10 is a schematic view illustrating an example head 1000 with a mounting structure 1002 that is configured to engaged with a feederhouse of a harvester. The head includes target areas 1004 that are configured to prevent reflection of laser light. Each target area 1004 corresponds to an individual laser positioned on the harvester. However, in other instances, although a head may include a plurality of target areas 1004, the harvester may include lasers fewer in number than the plurality of target areas 1004.

In the illustrated example, the target areas 1004 are positioned symmetrically relative to the mounting structure 1002. Particularly, in some implementations, the targets areas 1004 are positioned adjacent to corners defined by the mounting structure 1002. However, in other implementations, the target areas 1004 may be arranged in any desired configuration. Further, although four target areas 1004 are shown, in other implementations, fewer target areas corresponding to few lasers provided on the harvester.

FIG. 10 also includes a representation 1006 of a feederhouse of a harvester superimposed on the head 1000 with the representation 1006 shown with its location relative to the mounting structure 1002 of the head 1000. As indicated by the representation 1006, the feederhouse has a lateral tilt relative to the mounting structure 1002. In the illustrated example, the feederhouse includes lasers located adjacent to the four corners represented in the representation 1006 of the feederhouse, e.g., the lateral extents of the feederhouse. In other implementations, the locations of the lasers may be at any desired location, and the targets areas 1004 on the head 1000 corresponding to those locations of the lasers align when the feederhouse and the head 1000 are aligned. In some implementations, when a laser is aligned with a target area 1004, light from the laser is not reflected back to a sensor that detects laser light. The lack of reception of laser light by the sensor indicates alignment between the laser and the target area 1004. In such implementations, locations of the head 1000 near the target areas 1004 are reflective of laser light so that a controller, such as controller 502 or 632, is operable to determine whether alignment between a target area 1004 and laser exits. In other implementations, the target area 1004 is reflective of laser light whereas locations of the head 1000 near the target areas 1004 are not reflective of laser light. In this configuration, a controller is also able to use the reflected laser light to determine alignment between the laser and the target area 1004.

Figure 11:
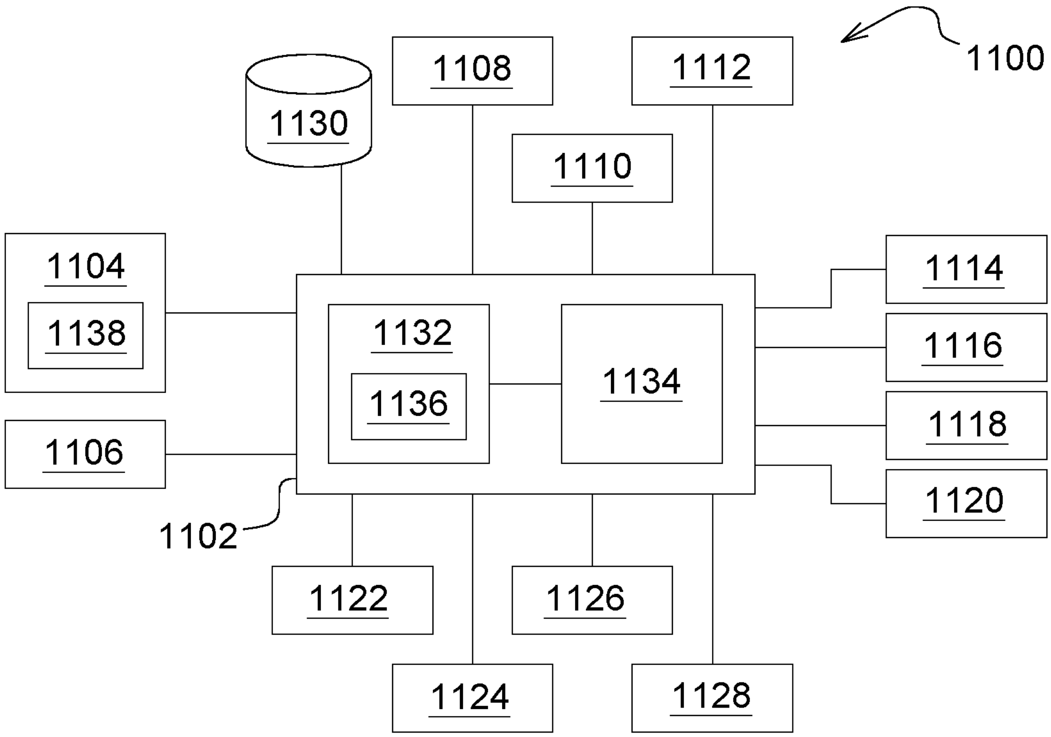
FIG. 11 is a schematic view of another example control system, according to some implementations of the present disclosure.

FIG. 11 is a schematic view of another example control system 1100. Control system 1100 is similar to control system 500 except where described. The control system 1100 includes an electronic controller 1102, similar to the controller 502; a display 1104, similar to display 506; an input device 1106, similar to input device 508; a first actuator 1108, similar to a first actuator 510; and a second actuator 1110, similar to the second actuator 512; and a proximity sensor 1112, similar to proximity sensor 518. The control system 1100 also includes lasers 1114 through 1120 and laser sensors 1122 through 1128. The laser sensors 1122-1128 are operable to detect the presence and the absence of presence of laser light. As explained earlier, the controller 1102 uses the output of the laser sensors 1122-1128 to detect alignment between one or more of the lasers 1114-1120 and one or more of the laser sensors 1122-1128. The controller 1102 uses this information to adjust a position of the feederhouse, using the first and second actuators 1108 and 1110, to align the feederhouse with the head, as described in more detail below.

The control system 1100 may also include or be communicably coupled to a remote database 1130 (similar to remote database 520), which may be in the form of cloud storage, a remote server, or some other type of electronic storage configured to store information. The various components of the control system 1100 are communicably coupled to the controller 502, such as via a wired or wireless connection. Similar to the controller 502, the controller 1102 includes a processor 1132, similar to processor 522, and a memory 1134, similar to memory 524. The processor 1132 executes software 1136 to control operation of the control system 1100, as described herein. For example, in some instances, the software 1136 includes executable instructions to accomplish a method to align a feederhouse with a head, such as the method 1200 described below. The display 1104 includes a GUI 1138, which may be similar to GUI 528.

Figure 12:
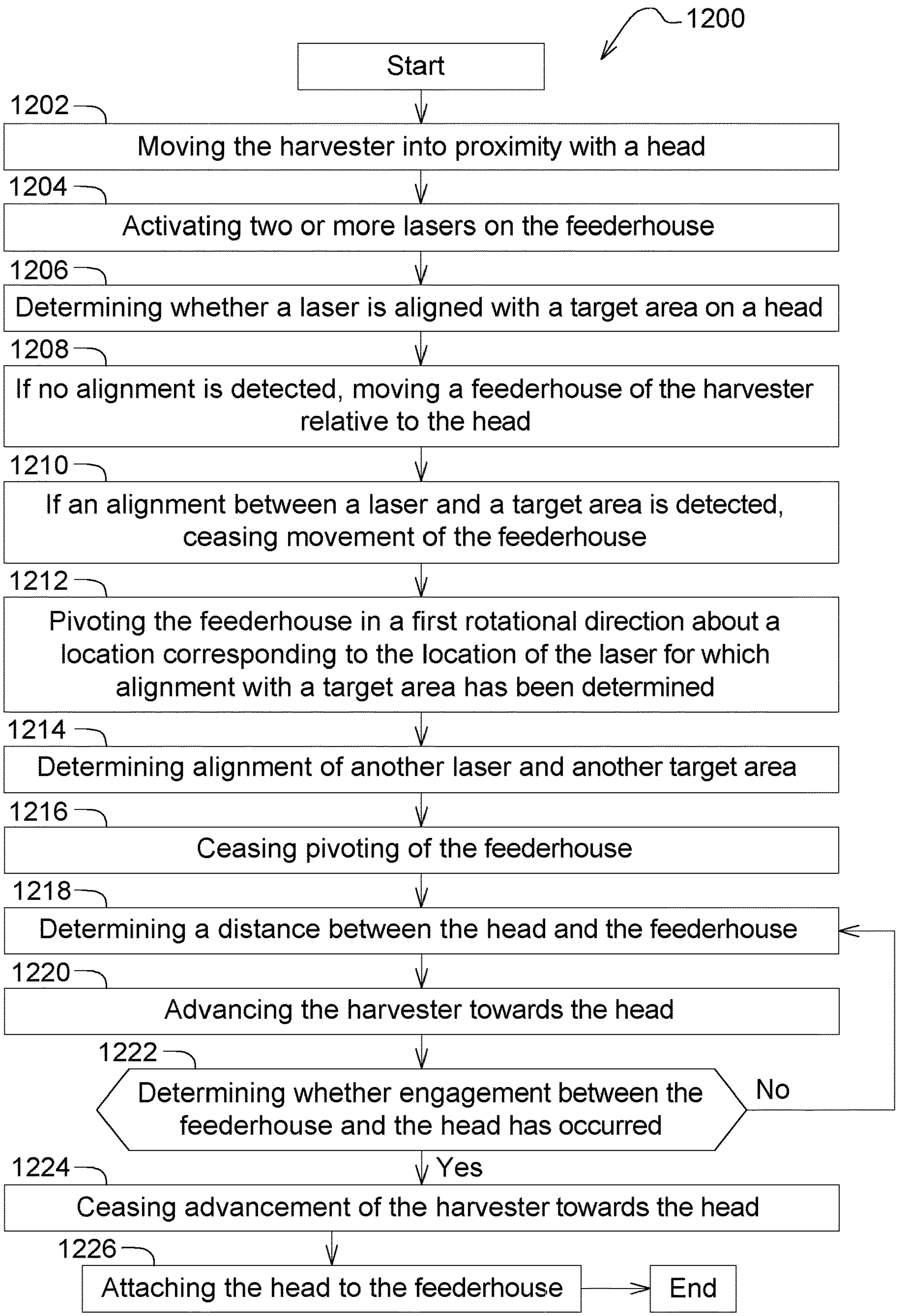
FIG. 12 a flowchart of an example method of using lasers to align a feederhouse of a harvester with a head automatically, according to some implementations of the present disclosure.

FIG. 12 is a flowchart of an example method 1200 of using lasers to align a feederhouse of a harvester with a head automatically. At 1202, a harvester is moved into proximity with a head. In some implementations, an operator of the harvester directs the harvester to a location adjacent to the head. In other implementations, the harvester is autonomously brought into a position adjacent to the head, such as 1000. At 1204, two or more lasers on the feederhouse are activated. In some implementations, two or more lasers are used to determine alignment between the feederhouse and the head and, particularly, the mounting structure of the head. In some instances, alignment is detected with lasers (e.g., lasers 1114 to 1120), laser sensors operable to sense reflected laser light (e.g., sensors 1122 through 1128), and target areas formed on the head, such as target areas configured to prevent or reduce reflection of laser light from the lasers. At 1206, a determination is made as to whether a laser aligns with a target area on the head. At 1208, if no alignment is detected, the feederhouse is moved relative to the head. In some instances, the feederhouse is moved in a cyclical manner relative to the head. For example, in some implementations, the feederhouse is moved in an orthogonal manner. For example, the feederhouse is moved vertically or generally vertically in a first direction relative to the head. If an alignment between a laser and a laser target is not detected as the feederhouse is moved in this way, e.g., by the lack of laser light reception by a laser sensor, the feederhouse is moved laterally by a selected amount. If there is still no indication of alignment between a laser and a target area, the head is again moved vertically or generally vertically in a second direction opposite the first direction. This cyclical movement of vertical motion and lateral motion continues until alignment between at least one laser and a target area occurs. Throughout this movement, a controller (e.g., controller 1102) detects whether alignment between a laser and a target area occurs. As explained above, alignment is determined to exist when at least one laser sensor does not detect reflected laser light, i.e., when the laser light strikes the target area and is not reflected by the target area. Although a cyclical vertical movement with lateral offsets is described, this is provided merely as an example. Other types of movements of the feederhouse to align a laser with a target area are within the scope of the present disclosure, such as cyclical horizontal movements with vertical offsets.

At 1210, alignment of a laser and a target area is detected. At 1212, the feederhouse is moved with a pivoting motion, with a center of the rotation being the laser for which alignment with a target area has been determined. In some implementations, the feederhouse is moved with the pivoting motion in a first radial direction with a selected amount of rotation. If an alignment between another laser and target area is not detected, the direction of rotation about the center of rotation is reversed, and the feederhouse is pivoted about the center of rotation by a selected amount. At 1214, alignment of another laser and target area is determined, indicating that the feederhouse and the mounting structure of the head is aligned. At 1216, pivoting the feederhouse is ceased upon determining that another laser is aligned with a target area.

In some implementations, the method 1000 includes additional features. For example, at 1218, a distance between the feederhouse and the head is sensed. For example, the distance may be sensed with a proximity sensor, such as proximity sensor 1112. At 1220, if space is detected between the harvester and the head, the harvester is advanced towards the head. At 1222, a determination is made as to whether engagement between the feederhouse and the head has occurred. Engagement may be detected based on an accelerometer that detects an impact or vibration that would occur upon contact between the feederhouse and the head. At 1224, if engagement is detected, advancement of the harvester is ceased, and, at 1226, the head is connected to the feederhouse, such as by actuation of a lock that secures the head to the feederhouse. If engagement is not detected, the method 1200 returns to 1218 where a distance is sensed and advancement of the harvester towards the head.

In some implementations, one or more aspects of the method 1200, described above, may be accomplished by an operator of the harvester. For example, in some implementations, visible lasers are used. Consequently, where the light from the lasers strikes the head may be visible to the operator of the harvester. As a result, the operator may use the reflected laser light to adjust an orientation of the feederhouse and, in some instances, the harvester itself, in order to align the lateral tilt of the feederhouse with the lateral tilt of the head as well as align a longitudinal position of the harvester with a longitudinal position of the head.

Without in any way limiting the scope, interpretation, or application of the claims appearing below, a technical effect of one or more of the example implementations disclosed herein is reduce or eliminate the difficulty with attaching a head to a harvester. Attaching a head to a harvester is a skill that is developed with experience. Therefore, coupling a head to a harvester can become problematic when inexperienced operators are responsible for making this connection and may involve damage to the harvester, the head, or both when a coupling task is improperly executed. Accordingly, another technical effect of one or more of the example implementations disclosed herein is a reduced risk of damage to the harvester, head, or both. Another technical effect of one or more of the example implementations disclosed herein is a reduction in time and cost associated with successfully connecting a head to a harvester.

Figure 13:
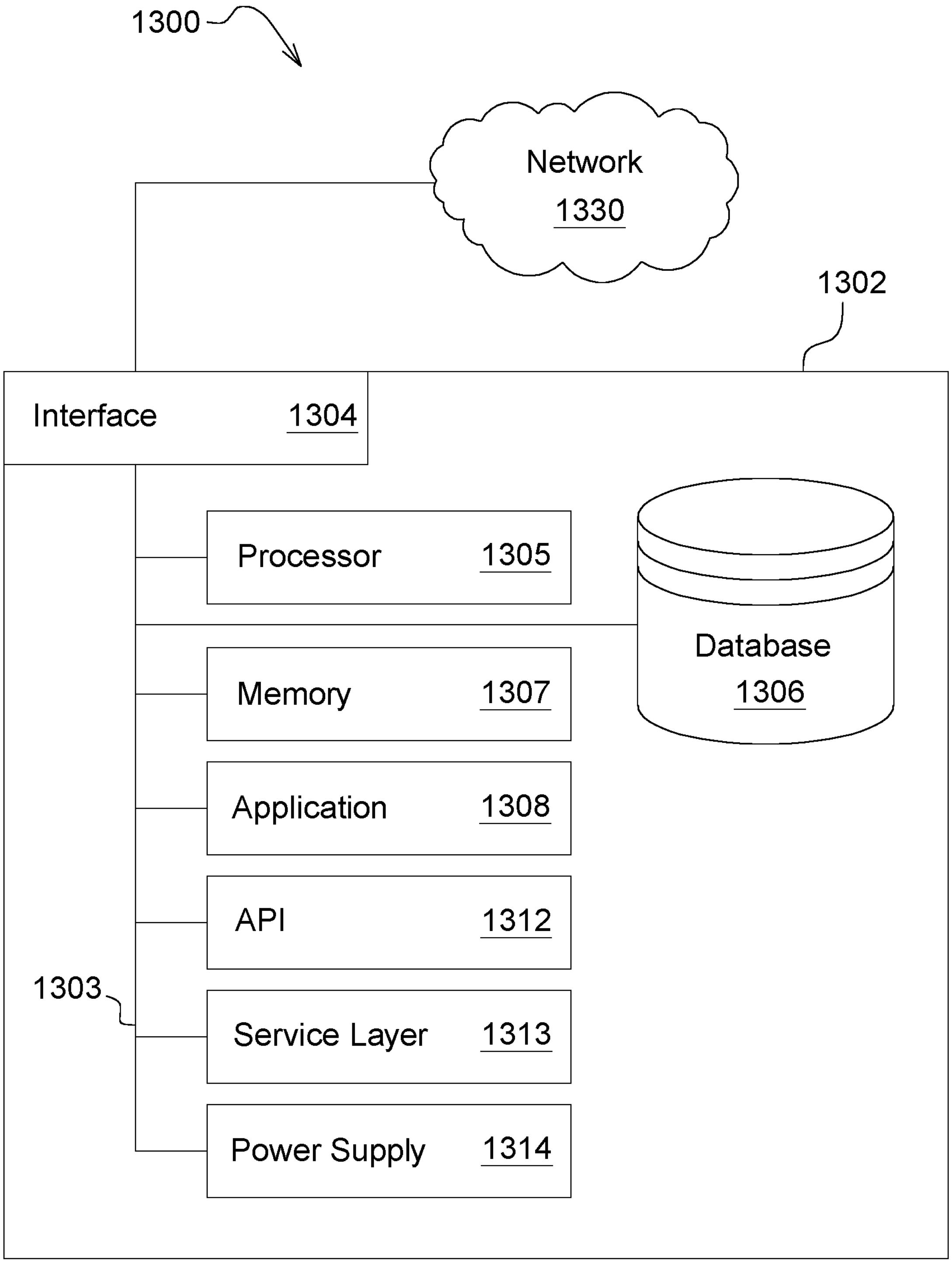
FIG. 13 is a block diagram illustrating an example computer system used to provide computational functionalities associated with described algorithms, methods, functions, processes, flows, and procedures as described in the present disclosure, according to some implementations of the present disclosure.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 10, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1002, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An apparatus comprising:
one or more processors;
a non-transitory computer-readable storage medium coupled to the one or more processors and storing programming instructions for execution by the one or more processors, the programming instructions instruct the one or more processors to:
sense an orientation of an agricultural head;
determine a tilt of the agricultural head based on the orientation of the agricultural head;
compare a tilt of the agricultural head to a tilt of a feederhouse of an agricultural harvester;
determine a difference between the tilt of the feederhouse and the tilt of the head; and
move the feederhouse to align the tilt of the feederhouse with the tilt of the agricultural head.

2. The apparatus of claim 1, wherein the programming instructions to instruct the one or more processors to sense an orientation of the agricultural head includes programming instructions to receive an image of an agricultural head.

3. The apparatus of claim 2, wherein the programming instructions to instruct the one or more processors to receive the image of the agricultural head includes programming instructions to instruct the one or more processors to receive the image from a camera located on the agricultural harvester.

4. The apparatus of claim 2, wherein the programming instructions to instruct the one or more processors to sense the orientation of an agricultural head includes programming instructions to instruct the one or more processors to determine the orientation of the agricultural head based on the image.

5. The apparatus of claim 1, wherein the programming instructions includes programming instructions to instruct the one or more processors to:
sense an orientation of the feederhouse; and
determine the tilt of the feederhouse based on the orientation of the feederhouse.

6. The apparatus of claim 5, wherein the programming instructions to instruct the one or more processors to sense the orientation of the feederhouse includes programming instructions to instruct the one or more processors to sense the orientation of the feederhouse with one of a pitch sensor and roll sensor.

7. The apparatus of claim 1, wherein the programming instructions to instruct the one or more processors to move the feederhouse to align the tilt of the feederhouse with the tilt of the agricultural head includes programming instructions to cause the one or more processors to actuate an actuator configured to pivot the feederhouse.

8. The apparatus of claim 1, wherein the programming instructions to instruct the one or more processors to move the feederhouse to align the tilt of the feederhouse with the tilt of the agricultural head includes programming instructions to alter one of a lateral tilt of the feederhouse and a longitudinal tilt of the feederhouse.

9. The apparatus of claim 1, wherein the programming instructions to instruct the one or more processors to sense an orientation of an agricultural head includes programming instructions to instruct the one or more processors to sense a feature of the agricultural head.

10. A computer-implemented method performed by one or more processors for automatically aligning a feederhouse of an agricultural harvester with an agricultural head, the method comprising:

sensing an orientation of an agricultural head;

determining a tilt of the agricultural head based on the orientation of the agricultural head;

comparing a tilt of the agricultural head to a tilt of a feederhouse of an agricultural harvester;

determining a difference between the tilt of the feederhouse and the tilt of the head; and moving the feederhouse to align the tilt of the feederhouse with the tilt of the agricultural head.

11. The computer-implemented method of claim 10, wherein sensing an orientation of an agricultural head comprises:

receiving an image of the agricultural head; and determining the orientation of the agricultural head using the image.

12. The computer-implemented method of claim 11, wherein receiving an image of the agricultural head comprises receiving the image from a camera located on the agricultural harvester.

13. The computer-implemented method of claim 12, wherein the camera is a stereo camera.

14. The computer-implemented method of claim 10, further comprising:

sensing an orientation of the feederhouse; and determining the tilt of the feederhouse based on the orientation of the feederhouse.

15. The computer-implemented method of claim 10, wherein sensing the orientation of the feederhouse includes sensing the orientation of the feederhouse with one of a pitch sensor and a roll sensor.

16. The computer-implemented method of claim 10, wherein moving the feederhouse to align the tilt of the feederhouse with the tilt of the agricultural head includes actuating an actuator configured to pivot the feederhouse.

17. The computer-implemented method of claim 10, wherein moving the feederhouse to align the tilt of the feederhouse with the tilt of the agricultural head includes altering one of a lateral tilt of the feederhouse and a longitudinal tilt of the feederhouse.

18. The computer-implemented method of claim 10, wherein sensing an orientation of an agricultural head includes sensing a feature of the agricultural head.

* * * * *